United States Patent [19]

Audeh et al.

[11] Patent Number: 4,963,340
[45] Date of Patent: Oct. 16, 1990

[54] CYCLIC PROCESS FOR CONVERTING METHANE TO CARBON DISULFIDE

[75] Inventors: Costandi A. Audeh, Princeton; Weldon K. Bell, Pennington, both of N.J.

[73] Assignee: Mobil Oil Corporation, Fairfax, Va.

[21] Appl. No.: 473,138

[22] Filed: Jan. 30, 1990

Related U.S. Application Data

[63] Continuation of Ser. No. 322,264, Mar. 13, 1989, abandoned.

[51] Int. Cl.$^5$ ............................................. C01B 31/26
[52] U.S. Cl. .................................................... 423/444
[58] Field of Search ......................................... 423/444

[56] References Cited

U.S. PATENT DOCUMENTS

| | | | |
|---|---|---|---|
| 2,565,195 | 8/1951 | Bell | 260/609 |
| 3,894,105 | 7/1975 | Chang et al. | 260/668 R |
| 4,265,735 | 5/1981 | Audeh et al. | 208/234 |
| 4,480,143 | 10/1984 | Chang et al. | 585/469 |
| 4,543,434 | 9/1985 | Chang | 585/310 |
| 4,618,732 | 10/1986 | Gesser et al. | 568/910.5 |
| 4,822,938 | 4/1989 | Audeh et al. | 585/310 |

*Primary Examiner*—H. M. S. Sneed
*Assistant Examiner*—J. Saba
*Attorney, Agent, or Firm*—Alexander J. McKillop; Charles J. Speciale; Edward F. Kenehan, Jr.

[57] ABSTRACT

There is provided a process for converting methane to carbon disulfide. More particularly, methane is decomposed to form elemental carbon and elemental hydrogen, and the elemental carbon is reacted with sulfur to form carbon disulfide. Carbon disulfide may then be contacted with hydrogen, optionally in the presence of more methane, under conditions sufficient to produce $CH_3SH$. This $CH_3SH$ may then be contacted with a sufficient catalyst, such as a zeolite, especially ZSM-5, under conditions sufficient to produce hydrocarbon having two or more carbon atoms.

2 Claims, No Drawings

CYCLIC PROCESS FOR CONVERTING METHANE TO CARBON DISULFIDE

This is a continuation of copending application Ser. No. 322,264, filed on Mar. 13, 1989, now abandoned.

CROSS-REFERENCE TO RELATED APPLICATION

This application is related to copending U.S. application Ser. No. 189,877, filed May 3, 1988, the entire disclosure of which is expressly incorporated herein by reference.

BACKGROUND

This application relates to processes for converting methane to carbon disulfide, wherein methane is converted to elemental carbon, which is, in turn, converted to carbon disulfide by reaction with elemental sulfur.

Natural gas is abundently available and provides a power source as a combustible fuel. However, the use of natural gas as fuel is often inconvenient for reasons of storage and handling. Accordingly, it would be desirable to convert components of natural gas to more valuable hydrocarbons. For example, conversion of natural gas to a liquid fuel would obviate certain problems of storage and handling. The main component of natural gas is methane.

Carbon disulfide is a commodity chemical having a variety of uses. Carbon disulfide may be used in the production of rayon, carbon tetrachloride and cellophane film. Carbon disulfide is also useful in other areas, e.g., as a chemical intermediate or as a solvent. Another use of $CS_2$ is described in the Chang U.S. Pat. No. 4,543,434 describes, inter alia, a process for converting methane by the following steps:

$$CH_4 + 4S \rightarrow CS_2 + 2H_2S$$

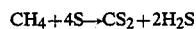

$$CS_2 + 3H_2 \xrightarrow{\text{Co or Ni}} CH_3SH + H_2S$$

$$CH_3SH \xrightarrow{\text{HZSM-5}} [CH_2] + H_2S$$

$$4H_2S \rightarrow H_2 + 4S$$

where $[CH_2]$ represents one or more hydrocarbons having at least two carbon atoms. The entire disclosure of this Chang U.S. Pat. No. 4,534,434 is expressly incorporated herein by reference.

SUMMARY

According to an aspect of this application, there is provided a process for converting methane to carbon disulfide, said process comprising the steps of:
 (i) decomposing methane under conditions sufficient to generate elemental carbon and hydrogen;
 (ii) reacting said elemental carbon of step (i) with elemental sulfur under conditions sufficient to generate carbon disulfide.

According to another aspect of this application, there is provided a process for converting methane to higher molecular weight hydrocarbons, said process comprising the steps of:
 (i) decomposing methane under conditions sufficient to generate elemental carbon and hydrogen;
 (ii) reacting said elemental carbon of step (i) with elemental sulfur under conditions sufficient to generate carbon disulfide;
 (iii) contacting said carbon disulfide of step (ii) with hydrogen under conditions sufficient to generate $CH_3SH$; and
 (iv) contacting said $CH_3SH$ of step (iii) with a sufficient catalyst under conditions sufficient to produce hydrogen sulfide and a mixture of hydrocarbons having at least two carbon atoms.

According to another aspect of this application, there is provided a process for converting methane to higher molecular weight hydrocarbons, said process comprising the steps of:
 (i) decomposing methane under conditions sufficient to generate elemental carbon and hydrogen;
 (ii) reacting said elemental carbon of step (i) with elemental sulfur under conditions sufficient to generate carbon disulfide;
 (iii) contacting said carbon disulfide of step (ii) with methane and hydrogen under conditions sufficient to generate $CH_3SH$, whereby methane is converted along with carbon disulfide in this step (iii), and
 (iv) contacting said $CH_3SH$ of step (iii) with a sufficient catalyst under conditions sufficient to produce hydrogen sulfide and a mixture of hydrocarbons having at least two carbon atoms.

When hydrogen is coproduced with hydrogen sulfide, the $H_2S$ may be separated by any known process, such as those processes exemplified in Chemical and Process Technology Encyclopedia, McGraw-Hill, 1974, pp 12-15. Hydrogen produced in this separation step may be used as a reactant along with unreacted methane and carbon disulfide.

Sulfur can be generated from hydrogen sulfide by the Claus process, wherein hydrogen sulfide is reacted with oxygen in the presence of alumina in accordance with the following reaction:

$$2H_2S + O_2 \xrightarrow{Al_2O_3} 2S + 2H_2O$$

Sulfur may also be obtained by the following reaction sequence:

$$2H_2S + 2(n/2M) \rightarrow 2M_{n/2}S + 2H_2$$

$$2M_{n/2}S \rightarrow 2(n/2M) + 2S$$

where M represents a suitable metal, e.g., a Group VIII or VIB metal. Examples of M include Fe, Co, Ni, Bi and Mo. This latter two-step reaction sequence for producing S is disclosed in the Chang U.S. Pat. No. 4,543,434. The reaction of hydrogen sulfide with metal may take place at temperatures between 0°–300° C. and at pressures between 0–2000 psig. The reaction of metal sulfide to regenerate metal and sulfur may take place at a temperature of from about 250° C. to about 1100° C. The sulfur produced may be recycled, e.g., into the reaction step, wherein methane is reacted with sulfur.

Carbon disulfide may be produced by decomposing methane to form elemental carbon and hydrogen, followed by reacting this elemental carbon with sulfur. Methane may be thermally decomposed to carbon and hydrogen in the absence of air, or oxygen or oxygen-containing compounds, to ensure that no methane conversion to oxygenates can take place. The hydrogen may be collected for further use. The heat required for this decomposition reaction could be supplied in any desirable form depending on the economics of the individual application. For example, the combustion of methane could be a primary source of heat for this reaction. It is possible that a catalytic surface may be used to enhance the decomposition reaction and thus reduce the fuel requirements of the reaction.

Elemental sulfur may be reacted with the freshly generated carbon so as to produce $CS_2$. Sulfur in the vapor phase is the best form of elemental sulfur for this reaction. Also, carbon produced in the pure form is the preferred form of carbon. The decomposition reaction and the reaction with sulfur may both take place in the same reactor, wherein elemental carbon is deposited on a solid surface as a product of the decomposition reaction. After the carbon deposited by the decomposition reaction is removed from the reactor by the reaction with sulfur, the introduction of sulfur may be stopped and the cycle of methane decomposition restarted.

The decomposition reaction and the reaction with sulfur could also be conducted with a carrier solid in transported bed or fluidized bed reactor systems. These systems feature a decomposition reaction zone (a); a gas/solid disengaging zone (b); a C/S reaction zone (c); and a gas/solid disengaging zone (d). Methane enters zone (a) decomposing to deposit carbon on the carrier solid and produce hydrogen. The carbon deposited on the carrier solid and gaseous reaction products are conducted to zone (b) where hydrogen and methane are separated for subsequent use. The carbon-containing solid is tranported in a conduit, where heat may be added, to zone (c). Sulfur entering zone (c) undergoes reaction with carbon on the solid to form $CS_2$. Small amounts of methane and hydrogen that enter zone (c) react with sulfur to form $CS_2$ and some $H_2S$. These products along with the carrier solid (now free of most carbon) are conducted to zone (d) where the solid is separated from $CS_2$-rich gaseous products. The carrier is transported through a conduit, where heat may be added, to zone (a). The $CS_2$-rich gas stream from zone (d) and the hydrogen-rich stream from zone (b) may be combined for use in a reaction discussed more fully hereinafter. Suitable solid carriers include refractory metal oxides such as $SiO_2$, $Al_2O_3$, $TiO_2$ and $ZrO_2$, e.g., clays; or pebbles. These carriers may have a low surface area, e.g., below about 50 $m^2/gm$.

One way to manufacture $CS_2$ is to react charcoal with sulfur in the vapor phase. Problems with this reaction include the source of the charcoal and the requirement for pure carbon. $CH_4$ is not likely to form ash on solid residues which should make it a source of pure carbon. Furthermore, in this approach hydrogen is produced which may be used in subsequent reactions.

Thermodynamic calculations indicate that when methane decomposition is conducted at 1200° F. and 1 atm pressure, 90% conversion of methane to carbon and hydrogen occurs. When decomposition is conducted at 1200° F. and 100 atm about 20% methane conversion occurs. When decomposition is conducted at 800° F. and 1 atm methane conversion is 30%. These calculations suggest that methane decomposition should be conducted at pressures below 100 atmospheres and temperatures above 1000° F.

After carbon disulfide is generated it may be contacted with methane and hydrogen under conditions sufficient to generate $CH_3SH$, whereby methane is converted along with carbon disulfide. The overall stoichiometry of this reaction may be as follows:

$$CH_4 + CS_2 + 2H_2 \rightarrow 2CH_3SH$$

Without being bound by any particular theory or mode of reaction, it is theorized that this overall reaction could possibly take place in two-steps as follows:

$$CS_2 + 2H_2 \rightarrow CH_3SH + S$$

$$S + CH_4 \rightarrow CH_3SH$$

The following table presents thermodynamic calculations for the present methane conversion, wherein methane is reacted along with the carbon disulfide and hydrogen, as a function of the temperature and pressure of the reaction:

|   | | % METHANE CONVERTED | | |
|---|---|---|---|---|
| K | ATM | 1 | 10 | 100 |
| 700 | | 1 | 7 | 38 |
| 600 | | 3 | 22 | 63 |
| 500 | | 16 | 56 | 85 |
| 400 | | 65 | 88 | 96 |

Examples of conditions for reacting methane with hydrogen and carbon disulfide include a temperature of from about 25° C. to about 500° C. and a pressure of from about 1 atmosphere to about 200 atmosphere.

Whenever methane is used as a reactant as described herein, it may be used in pure form or essentially pure form in admixture with trace amounts of impurities. The methane may also be reacted in the presence of other inert or reactive gasses. For example, natural gas may be used as a source of methane reactant.

The reaction of methane with carbon disulfide and hydrogen may take place in the presence or absence of hydrogen sulfide. When present in this reaction, the hydrogen sulfide may also react with methane and/or carbon disulfide under certain conditions. In addition to $CH_3SH$, other organosulfur compounds, such as $(CH_3)_2S$, may be coproduced in the reaction of methane with carbon disulfide and hydrogen.

Organosulfur compounds, such as $CH_3SH$ and $(CH_3)_2S$, may be contacted with a sufficient catalyst under conditions sufficient to produce hydrogen sulfide and a mixture of hydrocarbons having at least two carbon atoms. Examples of such reactions are described in the aforementioned Chang U.S. Pat. No. 4,543,434 and in the Audeh et al U.S. Pat. No. 4,265,735, the entire disclosure of which is expressly incorporated herein by reference. Similar reactions involving the production of gasoline are also described in U.S. Pat. Nos. 3,894,102 and 3,894,103, the entire disclosures of which are expressly incorporated herein by reference.

A preferred catalyst for converting organosulfur compounds to hydrocarbons, e.g., gasoline, is ZSM-5. However, other zeolites, such as those having a Constraint Index of from 1 to 12, may also be particularly useful.

The members of a particular class of zeolites useful for converting organosulfur compounds have an effective pore size of generally from about 5 to about 8 Angstroms, such as to freely sorb normal hexane. In addition, the structure provides constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the particular class. Windows of 10-membered rings are preferred, although, in some instances, excessive puckering of the rings or pore blockage may render these zeolite ineffective.

Although 12-membered rings in theory would not offer the same amount of constraint as 10-membered rings, it is noted that the puckered 12-ring structure of TMA offretite does show some constrained access. Other 12-ring structures may exist which may be particularly useful.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g., less than 5 Angstroms. On the other hand, zeolites which provide relatively free access to the internal zeolite structure have a low value for the Constraint Index, and usually pores of large size, e.g., greater than 8 Angstroms. The method by which Constraint Index is determined is described fully in U.S. Pat. No. 4,016,218, incorporated herein by reference for details of the method.

Constraint Index (CI) values for some typical materials are:

|  | CI (at test temperature) |
| --- | --- |
| ZSM-4 | 0.5 (316° C.) |
| ZSM-5 | 6-8.3 (371° C.-316° C.) |
| ZSM-11 | 5-8.7 (371° C.-316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6-2.0 (316° C.-399° C.) |

The above-described Constraint Index provides a means for identifying those zeolites which are useful in the present organosulfur conversion. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a useful means for characterizing the zeolites of particular interest is approximate, taking into consideration the manner of its determination, with the possibility, in some instances, of compounding variable extremes. However, in all instances, at a temperature within the above-specified range of 290° C. to about 538° C., the CI will have a value for any given zeolite of particular interest herein within the approximate range of 1 to 12.

In addition to the above-mentioned zeolites other suitable catalysts for converting organosulfur compounds to hydrodcarbons may include certain amorphous materials and other crystalline materials, particularly catalytically active molecular sieve materials, such as SAPO materials, as described in the Lok et al U.S. Pat. No. 4,440,871, the entire disclosure of which is expressly incorporated herein by reference.

Especially when ZSM-5 is employed as the active component of the catalyst, the conversion of organosulfur compounds to hydrocarbons and hydrogen sulfide may take place at a temperature of from about 200° C. to about 650° C. and at a pressure of from about 0 to about 2000 psig.

It is noted that certain of the reactions mentioned hereinabove generate hydrogen in the product. These reactions include the decomposition of methane deficiency of sulfur and the reaction of hydrogen sulfide with metal. This hydrogen may be recovered and used as a reactant in the reaction of methane along with carbon disulfide and hydrogen. A methane reformer may also be used to generate hydrogen reactant in accordance with the following reaction:

$$CH_4 + 2H_2O \rightarrow CO_2 + 4H_2.$$

What is claimed is:
1. A cyclic process for converting methane to carbon disulfide, said process comprising the steps of:
   (i) decomposing methane on a solid carrier in a decomposition zone under conditions sufficient to generate hydrogen and to deposit elemental carbon on said solid carrier;
   (ii) transporting the carbon-containing solid carrier from said decomposition zone of step (i) to a carbon/sulfur reaction zone;
   (iii) contacting said carbon-containing solid carrier with sulfur in said carbon/sulfur reaction zone under conditions sufficient to convert said elemental carbon and sulfur to carbon disulfide, thereby removing elemental carbon from said carrier; and
   (iv) transporting said carrier from said carbon/sulfur reaction zone of step (iii) to said decomposition zone of step (i), and repeating steps (i), (ii) and (iii).
2. A process according to claim 1, wherein the decomposition step (i) takes place at a pressure below 100 atmospheres and at a temperature above 1000° F.

* * * * *